United States Patent [19]

Hayakawa et al.

[11] Patent Number: 5,628,569
[45] Date of Patent: May 13, 1997

[54] FLUID BEARING UNIT AND MANUFACTURED METHOD THEREOF

[75] Inventors: Masamichi Hayakawa; Masato Gomyo; Toshihiko Miyakoshi; Arihiro Yonezawa, all of Nagano, Japan

[73] Assignee: Kabushiki Kaisha Sankyo Seiki Seisakusho, Nagano, Japan

[21] Appl. No.: 324,985

[22] Filed: Oct. 18, 1994

[30] Foreign Application Priority Data

| Oct. 18, 1993 | [JP] | Japan | 5-283990 |
| Jun. 16, 1994 | [JP] | Japan | 6-158120 |
| Aug. 9, 1994 | [JP] | Japan | 6-208007 |
| Aug. 31, 1994 | [JP] | Japan | 6-230794 |

[51] Int. Cl.$^6$ .................... F16C 32/06; F16C 33/82
[52] U.S. Cl. .................... 384/278; 384/100; 384/133
[58] Field of Search .................... 384/100, 114, 384/119, 278, 905, 133

[56] References Cited

U.S. PATENT DOCUMENTS

| 2,324,676 | 7/1943 | Butterfield | 384/278 |
| 3,841,720 | 10/1974 | Kovach et al. | 384/123 |
| 3,947,079 | 3/1976 | Anderson | 384/603 |
| 4,032,268 | 6/1977 | Wankel | 384/425 X |
| 4,832,908 | 5/1989 | Ishikawa et al. | 420/95 |
| 4,904,447 | 2/1990 | Handa | 420/95 |
| 5,238,308 | 8/1993 | Lang et al. | 384/100 X |
| 5,310,264 | 5/1994 | Mishima et al. | 384/100 |

FOREIGN PATENT DOCUMENTS

| 118322 | 5/1993 | Japan | 384/905 |

*Primary Examiner*—Thomas R. Hannon
*Attorney, Agent, or Firm*—Sughrue, Mion, Zinn, Macpeak & Seas

[57] ABSTRACT

A fluid bearing unit includes a shaft; a bearing; bearing fluid arranged between a shaft and a bearing which are rotatably engaged with each other so that they can be relatively rotated so as to generate dynamic pressure in the bearing fluid, wherein at least one of the bearing and the member for fixing the bearing unit is made of iron alloy having the volumetric magnetostriction of which acts to cancel the thermal expansion so as to become the coefficient of linear expansion thereof lower than that of the shaft.

13 Claims, 5 Drawing Sheets

FLUID BEARING UNIT AND MANUFACTURED METHOD THEREOF

BACKGROUND OF THE INVENTION

1. Field of the invention

The present invention relates to a fluid bearing unit in which the dynamic pressure of fluid is utilized.

2. Related art

Conventionally, various drive units for driving a rotational body are well known, in which the shaft and the bearing are supported through a fluid bearing unit so that they can be relatively rotated.

For example, in a spindle motor for driving a disk, a lubricant such as oil (bearing fluid) is charged between a radial sliding bearing made of stainless steel stipulated as SUS or copper alloy and a shaft made of stainless steel stipulated as SUS, and a non-contact sliding section is formed by the dynamic pressure of bearing fluid, so that the shaft and the bearing can be relatively rotatably supported.

However, in the fluid bearing unit in which the shaft is made of stainless steel stipulated as SUS and the radial bearing is made of stainless steel stipulated as SUS or copper alloy, the viscosity (coefficient of viscosity) of bearing fluid is changed in accordance with a change in the temperature of an environment in which the rotational body drive unit is used. Therefore, the fluid bearing unit is greatly affected by the change in viscosity.

For example, when a diameter of the shaft is 4 mm and a clearance of the bearing is 4 mm and a change in the environmental temperature is ±30° C. with respect to the normal temperature, and when the bearing fluid is a common oil, the viscosity is reduced to ⅓ of the normal value on a high temperature side, and the viscosity is increased to 3 times of the normal value on a low temperature side.

In this connection, the dynamic pressure of bearing fluid is in inverse proportion to the square of a clearance formed between the shaft and the radial sliding bearing. Also, the dynamic pressure of bearing fluid is in proportion to the viscosity of bearing fluid.

Accordingly, on the assumption that the dynamic pressure of bearing fluid is affected only by the viscosity, the dynamic pressure is reduced to ⅓ at high temperature.

Also, the bearing loss (viscosity resistance) is in inverse proportion to the clearance and proportion to the viscosity. Accordingly, on the assumption that the dynamic pressure of bearing fluid is affected only by the viscosity, the bearing loss is increased to 3 times at low temperature.

In this connection, Japanese Unexamined Patent Publication No. 5-118322 discloses a technique characterized in that the shaft is made of material, the thermal expansion coefficient of which is higher than that of material composing the radial sliding bearing. According to this technique, a decrease in the dynamic pressure at high temperature and an increase in the bearing loss at low temperature can be prevented.

However, in the fluid bearing unit described above, the radial sliding bearing is made of ceramics. When ceramics is used for the bearing, machining is complicated, so that the cost is raised. Further, it is difficult to enhance the dimensional accuracy.

SUMMARY OF THE INVENTION

An object of the present invention is to provide a fluid bearing unit in which changes in dynamic pressure and bearing loss can be reduced even when the environmental temperature is changed.

Another object of the present invention is to provide a method of easily manufacturing a fluid bearing unit of high dimensional accuracy.

Another object of the present invention is to provide a fluid bearing unit of simple structure, characterized in that: changes in dynamic pressure and bearing loss can be excellently reduced even when the environmental temperature is changed; and the bearing function can be excellently maintained irrespective of a change in the environmental temperature.

An aspect of the present invention, there is provided a fluid bearing unit comprising, a shaft; a bearing; bearing fluid arranged between a shaft and a bearing which are rotatably engaged with each other so that they can be relatively rotated so as to generate dynamic pressure in the bearing fluid; and a bearing fixing member for fixing the bearing unit, wherein at least one of the bearing and the bearing fixing unit is made of iron alloy having the volumetric magnetostriction of which acts to cancel the thermal expansion so as to become the coefficient of linear expansion thereof lower than that of the shaft.

Another aspect of the present invention, there is provided fluid bearing unit comprising: a shaft; a bearing; bearing fluid arranged between a shaft and a bearing which are rotatably engaged with each other so that they can be relatively rotated so as to generate dynamic pressure in the bearing fluid; a bearing fixing member for fixing the bearing unit, wherein at least one of the bearing and the bearing fixing member is made of iron alloy having the volumetric magnet striction of which acts to cancel the thermal expansion so as to become the coefficient of linear expansion thereof lower than that of the shaft and a portion on the inner circumferential surface of the bearing radially corresponding to the bearing fixing portion of the bearing fixing member is not used as a bearing surface.

Another aspect of the present invention, there is provided a method for manufacturing a fluid bearing unit comprising the steps of: pressuring powder of SUPER-INVER so as to solid the powder; backing and solidifying it at a temperature approximately 1000° so as to melt the surface of the powder; and impregnating resin into blow-holes of a sintered body.

Another aspect of the present invention, there is provided a fluid bearing unit comprising a shaft, a bearing, bearing fluid arranged between a shaft and a bearing which are rotatably engaged with each other so that they can be relatively rotated so as to generate dynamic pressure in the bearing fluid; a bearing fixing member for fixing the bearing unit, a recess section provided on a bearing fixing surface of the bearing fixing member, wherein at least one of the bearing and the bearing fixing member is made of iron alloy having the volumetric magnetostriction of which acts to cancel the thermal expansion so as to become the coefficient of linear expansion thereof lower than that of the shaft.

Another aspect of the present invention, there is provided a method for manufacturing a fluid bearing unit comprising the steps of: kneading powder of SUPER-INVAR with binder including polyethylene resin; injecting it into a metallic mold so as to form an intermediate body; vaporizing the binder from the intermediate body by hearing the intermediate body in a range from 200° to 300°; and baking and solidifying the intermediate body not less than 1000°.

As described above, according to the fluid bearing unit of this invention, at least one of the bearing and the member for fixing the bearing is made of iron alloy such as INVAR or SUPER-INVAR, the magnetostriction of which acts to cancel the thermal expansion so that the coefficient of linear expansion becomes lower than that of the shaft. Accordingly, the bearing clearance is reduced at high temperature. On the other hand, the bearing clearance is extended at low temperature. Therefore, it is possible to reduce changes in the dynamic pressure and bearing loss which are caused in accordance with a change in the environmental temperature.

Further, according to the fluid bearing unit of the present invention, a stress dispersion means for maintaining the bearing surface at a uniform temperature changing condition is provided at least in one of the bearing and the bearing engaging member, so that the non-uniformity on the bearing surface can be avoided which is caused by the stress concentration generated in accordance with a change in the temperature of the bearing and a change in the temperature of the engaging member. Therefore, the uniformity of the bearing surface can be excellently maintained irrespective of a change in temperature, and the reliability of the fluid bearing unit can be enhanced.

As described above, according to the fluid bearing unit of the present invention, when a thermal stress is activated on the bearing by the bearing fixing member in the case of a change in the environmental temperature, the portion on the inner circumferential surface of the bearing affected by the thermal stress is not used as a bearing surface. Therefore, the bearing gap between the shaft and the bearing surface is not extended by the thermal stress transmitted from the bearing fixing member at high temperature, and it is not reduced at low temperature.

According to the method of manufacturing the fluid bearing unit of this invention, at least one of the bearing and the bearing fixing member is molded by the method of powder metallurgy (the sintering method). Therefore, the members can be simply molded, and the dimensional accuracy can be highly enhanced.

Further, resin to which materials having lubricating and anti-abrasion abilities are added is impregnated into the sintered body, the sliding and anti-abrasion abilities can be enhanced.

DETAILED DESCRIPTION OF THE PREFERRED EMBODIMENTS

EXAMPLE I

With reference to the accompanying drawings, Example I of the present invention will be explained as follows.

Figure 1:
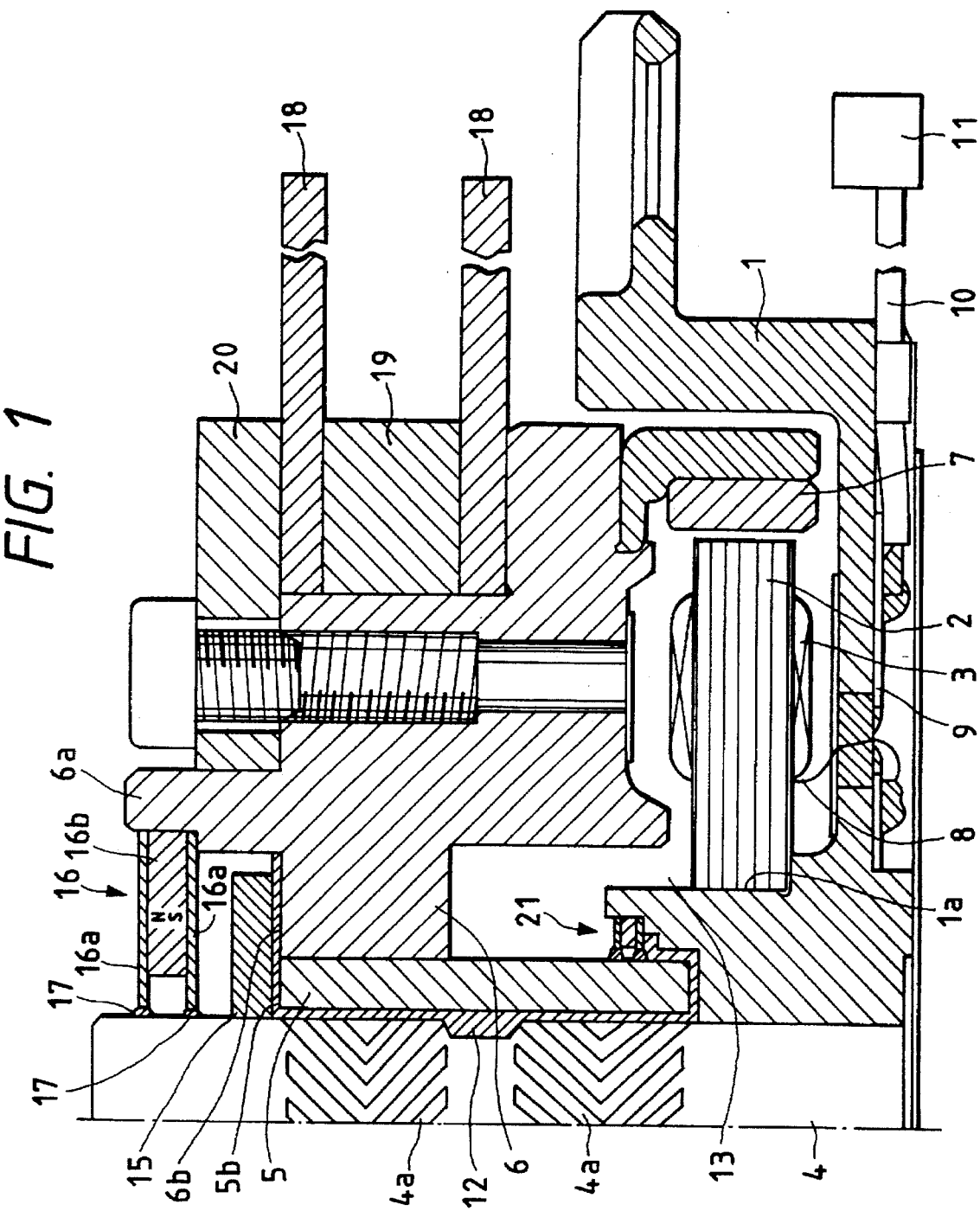
FIG. 1 is a lateral sectional view of the drive unit for driving a rotational body to which the fluid bearing unit of Example I of the present invention is applied.

FIG. 1 is a laterally sectional view of the motor to which the fluid bearing unit of Example I of the present invention is applied. In FIG. 1, a central shaft fixing type spindle motor for driving magnetic disks is shown. In order to avoid the drawing from becoming complicated, only a right half with respect to the center line is shown in FIG. 1. In FIG. 1, numeral 1 denotes a frame that is a motor housing. A through-hole is formed at the center of the frame 1, and a groove of which the width is constant is formed along the circumference on one side (on the upper side in FIG. 1). A stator core 2 is fixed onto an inner circumferential surface 1a of the groove, and a coil 3 is wound around the stator core 2.

A central fixing shaft 4, for example, made of stainless steel stipulated as SUS is engaged with the through-hole. A dynamic pressure generating means, for example, a plurality of herring-bone-shaped dynamic pressure generating grooves 4a are formed on an outer circumferential surface of the central fixing shaft 4.

A radial sliding bearing 5, for example, made of SUPER-INVAR (32% Ni-5% Co-Fe) is idly engaged with the outer circumferential surface of the central fixing shaft 4. A hub 6 having a configuration which covers the stator core 2 and the coil 3 is fixed onto the radial sliding bearing 5 by means of press-fitting.

A protrusion 6a protruding upward is provided on an upper surface of the hub 6. An upper surface 6b located inside of the protrusion 6a of the hub 6 is flush with an upper surface 5b of the radial sliding bearing 5.

A ring-shaped clamp member 15 is fit with the outer circumference of the central fixing shaft 4 at an upper portion with respect to the upper surface 5b of the radial sliding bearing 5. An outer circumferential surface of the clamp member 15 is larger than that of the radial sliding bearing 5, so that the radial sliding bearing 5 and the hub (rotational body) 6 are prevented from becoming detached from the central fixing shaft 4 to the outside of the unit.

A magnetic fluid seal 16 is provided on the inner circumference of the protrusion 6a at an upper position with respect to the clamp member 15. The magnetic fluid seal 16 includes a magnet 16b, and pole pieces 16a, 16a which are magnetic pole pieces forming a magnetic path, wherein the magnet 16b is interposed between the pole pieces 16a, 16a. Magnetic fluid 17, 17 is held between the inner circumferential surfaces of the pole pieces 16a, 16a and the outer circumferential surface of the central fixing shaft (magnetic body) 4.

Accordingly, a lubricant (bearing fluid) 12 such as oil charged into the sliding section can be prevented from leaking from the bearing section to the outside of the bearing unit by the magnetic fluid seal 16, and further dust can be prevented from getting into the bearing. In this connection, the bearing fluid may have a magnetic property.

Magnetic disks 18, 18 are attached onto the outer circumferential surface of the hub 6, wherein a spacer 19 is interposed between the magnetic disks 18, 18 in the axial direction. On the other hand, a drive magnet 7 is fixed onto the inner circumferential surface of the hub 6 at a position opposed to the stator core 2.

A terminal wire 8 emerges from the coil 3 and is soldered to a predetermined position (soldering position) on a flexible base board 9, on the upper surface of which a conductor pattern is provided. One end of the flexible lead 10 is connected with an end of the conductor pattern provided on the flexible base board 9. The other end of the flexible lead 10 is connected with an electric power supply means 11 located outside of the motor.

When a predetermined driving voltage is supplied from the electric power supply means 11 to the coil 3 through the flexible lead 10, the conductive pattern and the terminal wire 8, the hub 6 to which magnetic disks 18, 18 are attached is rotated.

In this connection, numeral 20 denotes a disk holder, and numeral 21 denotes a magnetic fluid seal provided in the middle of a passage 13 communicating the lower portion with the outside.

As described above, the fluid bearing unit of Example I is characterized in that the radial bearing 5 is made of, for example, SUPER-INVAR (32%Ni-5%Co-Fe), which has a characteristic by which the volumetric magnetostriction cancels the thermal expansion caused in the bearing. In other words, the coefficient of linear expansion of SUPER-INVAR is 0.1 ppm which is lower than 15 ppm of the coefficient of linear expansion of the shaft 4 made of stainless steel stipulated as SUS.

The inventors made an experiment under the following condition in which the radial sliding bearing 5 made of SUPER-INVAR was used.

Diameter of the shaft 4: 4 mm

Clearance of the bearing: 4 mm

Change in the environmental temperature: the normal temperature ±30° C.

As a result of the experiment, the following inequality was satisfied.

(Bearing clearance at high temperature: 2.2 mm) <(Bearing clearance at the normal temperature: 4 mm) Since the dynamic pressure is in inverse proportion to the square of the bearing clearance, the dynamic pressure was seldom reduced.

Also the following inequality was satisfied. (Bearing clearance at low temperature: 5.8 mm) >(Bearing clearance at the normal temperature: 4 mm) Since the bearing loss is in inverse proportion to the bearing clearance, an increase in the bearing loss was maintained to be approximately twice. Conventionally, an increase in the bearing loss was approximately three times.

As described above, in Example I of the present invention, the radial sliding bearing 5 was made of SUPER-INVAR. Therefore, the volumetric magnetostriction canceled the thermal expansion. As a result, the linear expansion coefficient of the radial sliding bearing 5 was lower than that of the shaft 4. Accordingly, the bearing clearance was reduced at high temperature, so that the dynamic pressure was seldom reduced. On the other hand, the bearing clearance was extended at low temperature, so that the bearing loss was not increased. Consequently, it is possible to reduce changes in dynamic pressure and bearing loss even if the environmental temperature changes.

As described above, according to the fluid bearing unit of this example, at least one of the bearing and the member for fixing the bearing is made of iron alloy such as INVAR or SUPER-INVAR, the magnetostriction of which acts to cancel the thermal expansion so that the coefficient of linear expansion becomes lower than that of the shaft. Accordingly, the bearing clearance is reduced at high temperature. On the other hand, the bearing clearance is extended at low temperature. Therefore, it is possible to reduce changes in the dynamic pressure and bearing loss which are caused in accordance with a change in the environmental temperature.

EXAMPLE II

With reference to the accompanying drawings, Example II will be explained as follows, in which the present invention is applied to a rotary shaft type spindle motor for driving magnetic disks.

Figure 2:
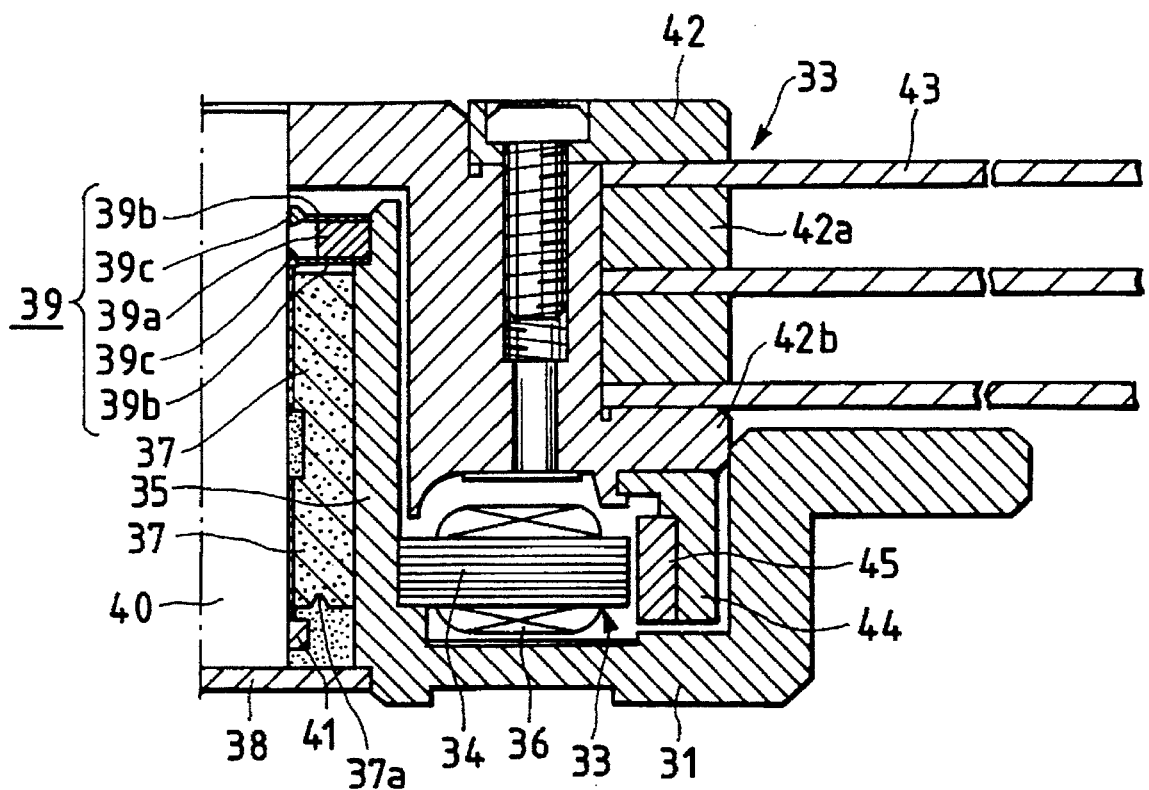
FIG. 2 is a lateral sectional view of the drive unit for driving a rotational body to which the fluid bearing unit of Example II of the present invention is applied.

In FIG. 2, the spindle motor for driving magnetic disks includes: a set of stator 32 which is a fixed member assembled to a frame 31; and a set of rotors 33 which are rotary members assembled being stacked from the upper side in the drawing. A stator core 34 composing the set of stator 32 is engaged with an outer circumferential portion of an approximately cylindrical bearing holder 35 which is an engaging member vertically provided approximately at the center of the frame 31. A coil 36 is wound around a protruding portion of the stator core 34.

Integrally formed radial sliding bearings 37, 37 are engaged with an inner circumferential portion of the bearing holder 35 while the radial sliding bearings 37, 37 are separated from each other by a predetermined distance in the axial direction, and the rotational shaft 40 is rotatably supported by this pair of radial sliding bearings 37, 37. Inner circumferential surfaces of both radial bearings 37, 37 compose non-contact sliding sections with respect to the outer circumferential surface of the rotational shaft 40 through bearing fluid. In this connection, the bearing fluid may have a magnetic property.

To explain in detail, a dynamic fluid sliding surface is composed of the inner circumferential surface of each radial sliding bearing 37 and the outer circumferential surface of the rotational shaft 40 in the radial direction. As a dynamic pressure generating means, for example, a plurality of herring-bone-shaped dynamic pressure generating grooves are provided on the outer circumferential surface of the rotational shaft 40.

In this case, the rotational shaft 40 is made of stainless steel stipulated as SUS, and the radial sliding bearing 37 is made of iron alloy, the coefficient of linear expansion of which is lower than that of the rotational shaft 40.

An example of iron alloy used for the radial sliding bearing is SUPER-INVAR (32%Ni-5%Co-Fe). SUPER- INVAR has a characteristic by which the volumetric magnetostriction cancels the thermal expansion. The coefficient of linear expansion of SUPER-INVAR is 0.1 ppm which is lower than 15 ppm of the coefficient of linear expansion of the shaft 40 made of stainless steel stipulated as SUS.

Further, as a stress dispersion means, a cutout portion 37a is provided in the radial sliding bearing 37. The cutout portion 37a is provided for maintaining a surface of the radial sliding bearing 37 in a uniform condition even if the environmental temperature changes. The cutout portion 37a is formed on an end face of the radial sliding bearing 37, the end face being located inside in the axial direction. In other words, this end face is a lower end face of the radial sliding bearing 37 in the drawing. In this example, a transverse section of the cutout portion 37a is formed to be approximately semicircular.

An end of the rotational shaft 40, that is, a lower end of the rotational shaft 40 in the drawing slidably comes into contact with a thrust receiving plate 38 for covering an opening of the bearing holder 35 on the lower side in the drawing. The end surface of the rotational shaft 40 and the thrust receiving plate 38 compose a dynamic pressure sliding surface in the thrust direction. A flange-shaped clamp member 41 is fixed to the end of the rotational shaft 40. By the action of the clamp member 41, the overall rotor set 33 is not disconnected from the stator set 32.

On the other hand, the hub 42 composing the rotor set 33 is fixed to an end of the rotational shaft 40, the end being located outside in the axial direction, that is, on the upper side in the drawing. The hub 42 is provided with an approximately cylindrical barrel portion 42a, to the outer circumferential portion of which a plurality of magnetic disks 43 are attached. A drive magnet 45 is annularly attached to a flange-shaped mount 42b on the lower end of the barrel portion 42a through a back yoke 44. The drive magnet 45 is disposed close to an outer circumferential end surface of the stator core 34 in such a manner that the drive magnet 45 is annularly opposed to the outer circumferential end surface of the stator core 34.

A magnetic fluid seal 39 for preventing the leakage of bearing fluid is disposed at an opening of the bearing holder 35 on the upper end side in the drawing. The magnetic seal 39 is provided with a magnet 39a annularly attached onto an inner circumferential wall of the bearing holder 35, and a pair of pole pieces 39b, 39b are attached on both end surfaces of the annular magnet 39a in the axial direction. Magnetic fluid 39c, 39c is held between an inner circumferential end of each pole piece 39b and an outer circumferential surface of the rotational shaft 40. Sealing function of the bearing fluid can be provided by the magnetic fluid 39c.

As described above, in Example II, the radial sliding bearing 37 is made of iron alloy, the volumetric magnetostriction of which cancels the thermal expansion so that the coefficient of linear expansion is lower than that of the shaft. Therefore, the bearing clearance is reduced at high temperature and extended at low temperature.

The inventors made an experiment under the following condition in which the radial sliding bearing 37 made of SUPER-INVAR was used.

Diameter of the shaft 40: 4 mm
Clearance of the bearing: 4 mm
Change in the environmental temperature: the normal temperature ±30° C.

As a result of the experiment, the following inequality was satisfied.

(Bearing clearance at high temperature: 2.2 mm) <(Bearing clearance at the normal temperature: 4 mm) Therefore, it was confirmed that the dynamic pressure was in inverse proportion to the square of the bearing clearance and the dynamic pressure was seldom reduced.

Also the following inequality was satisfied.
(Bearing clearance at low temperature: 5.8 mm) >(Bearing clearance at the normal temperature: 4 mm) Since the bearing loss was in inverse proportion to the bearing clearance, an increase in the bearing loss was maintained to be approximately twice. Conventionally, the increase in the bearing loss was maintained to be approximately three times.

As described above, in Example II of the present invention, the bearing clearance was reduced at high temperature, so that the dynamic pressure was seldom reduced. On the other hand, the bearing clearance was extended at low temperature, so that the bearing loss was not increased. Consequently, it is possible to reduce changes in dynamic pressure and bearing loss even if the environmental temperature changes.

When the environmental temperature changes, a stress concentration occurs on a joining surface of the radial sliding bearing 37 and the bearing holder 35, and especially a stress concentration tends to occur on the end surface in the axial direction. Due to the stress concentration, there is a possibility that the bearing surface of the radial sliding bearing 37 is curved and the uniformity of the bearing surface is deteriorated. In order to solve the above problems, in Example II, there is provided a cutout 37a which functions as a stress dispersion means. The occurrence of stress concentration can be avoided and strain can be absorbed by the cutout 37a. As a result, the uniformity of the bearing surface can be excellently maintained and a normal bearing clearance can be always provided.

Next, with reference to FIGS. 3 through 8, other examples of the stress dispersion means capable of providing the same effect as that of Example II will be explained as follows.

In each example, the upper end surface of the radial sliding bearing 37 in the axial direction substantially coincides with the upper end surface of the bearing holder 35 in the axial direction. Due to the foregoing, a stress dispersion means is composed.

Figure 3A:
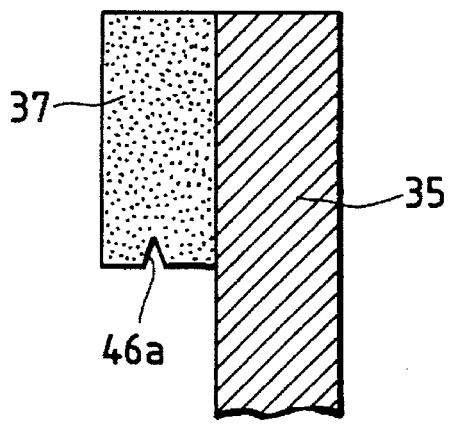
FIGS. 3(a) and (b) are partially enlarged lateral sectional views showing the primary portions of the fluid bearing units of Examples II-2 and II-3 of the present invention.

In addition to that, in Example II-2 shown in FIG. 3(a), an approximately triangular cutout 46a is formed on the lower end surface of the radial sliding bearing 37 in the axial direction.

Figure 3B:
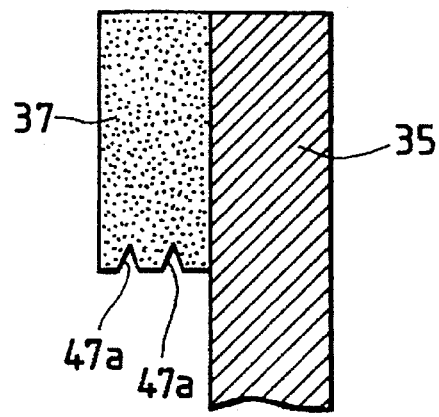

In Example II-3 shown in FIG. 3(b), a pair of approximately triangular cutouts 47a are formed in the radial direction.

Figure 4:
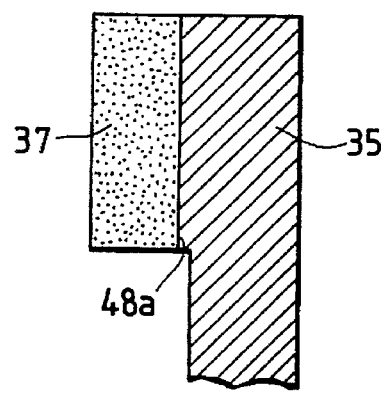
FIG. 4 is a partially enlarged lateral sectional view showing the primary portion of the fluid bearing unit of Examples II-4 of the present invention.

In Example II-4 shown in FIG. 4, the bearing holder 35 is formed to be thick in a portion where the radial sliding bearing 37 and the bearing holder 35 are joined. Due to the foregoing, the stress dispersion means 48a is composed.

Figure 5:
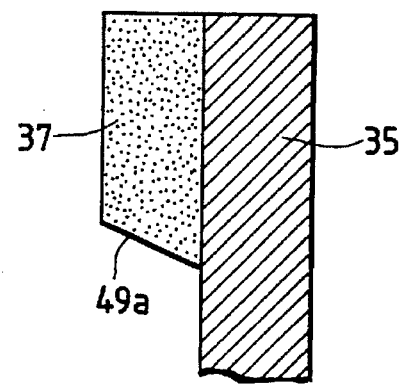
FIG. 5 is a partially enlarged lateral sectional view showing the primary portion of the fluid bearing unit of Examples II-5 of the present invention.

In Example II-5 shown in FIG. 5, the lower inside end surface of the radial sliding bearing 37 in the axial direction is formed to be a tapered surface 49a. In this way, the stress dispersion means 48a is composed.

Figure 6A:
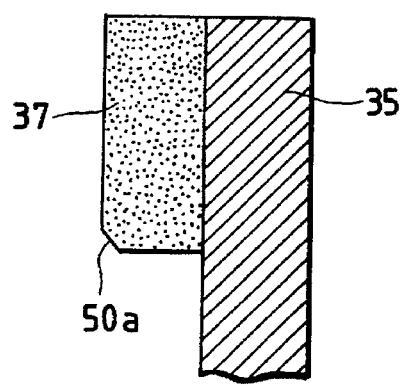
FIGS. 6(a) and (b) are partially enlarged lateral sectional views showing the primary portion of the fluid bearing unit of Examples II-6 of the present invention.
Figure 6B:
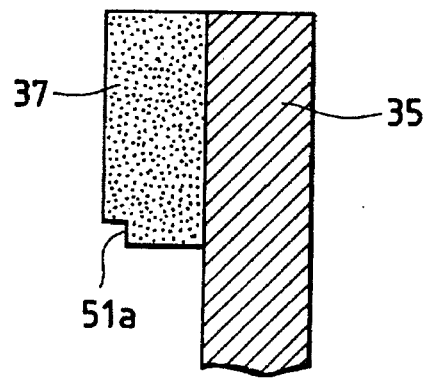

In Example II-6 shown in FIGS. 6(a) and 6(b), a portion on the surface of the radial sliding bearing 37 upon which stress is concentrated, that is, a portion corresponding to the lower inside end of the radial sliding bearing 37 is not used as a bearing surface.

In Example II-6 shown in FIG. 6(a), a triangular cutout 50a is formed in the lower inside end of the radial sliding bearing 37 in the axial direction.

In Example II-6 shown in FIG. 6(b), a triangular cutout 51a is formed in the lower inside end of the radial sliding bearing 37 in the axial direction.

Figure 7:
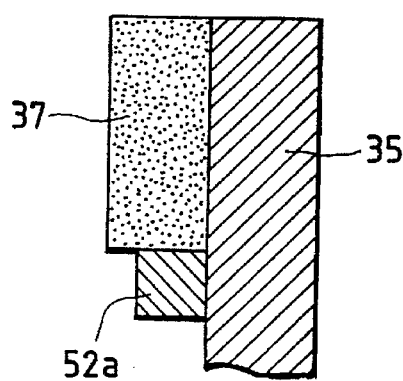
FIG. 7 is a partially enlarged lateral sectional view showing the primary portion of the fluid bearing unit of Examples II-7 of the present invention.

In Example II-7 shown in FIG. 7, a reinforcing member 52a made of iron alloy composing the radial sliding bearing 37 or alternatively made of material of which the linear expansion coefficient is close to that of iron alloy is adhered as a stress dispersion means upon the lower end surface of the radial sliding bearing 37 in the axial direction.

Figure 8:
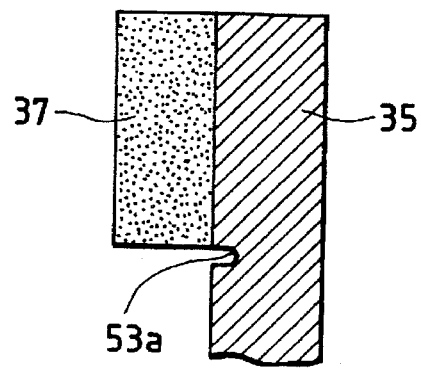
FIG. 8 is a partially enlarged lateral sectional view showing the primary portion of the fluid bearing unit of Examples II-8 of the present invention.

In Example II-8 shown in FIG. 8, a cutout 53a is provided as a stress dispersion means in the bearing holder 37 which is an engaging member. An inner wall surface of the cutout 53a coincides with the lower end surface of the radial sliding bearing 37, so that a strain caused by stress concentration can be absorbed by the cutout 53a.

According to the fluid bearing unit of the present invention, at least one of the bearing and the member for fixing the bearing is made of iron alloy, the volumetric magnetostriction of which acts to cancel the thermal expansion so that the coefficient of linear expansion becomes lower than that of the shaft. Accordingly, the bearing clearance is reduced at high temperature. On the other hand, the bearing clearance is extended at low temperature. Therefore, it is possible to reduce changes in dynamic pressure and bearing loss which is caused by a change in the environmental temperature.

Further, according to the fluid bearing unit of the present invention, a stress dispersion means for maintaining the bearing surface at a uniform temperature changing condition is provided at least in one of the bearing and the bearing engaging member, so that the non-uniformity on the bearing surface can be avoided which is caused by the stress concentration generated in accordance with a change in the temperature of the bearing and a change in the temperature of the engaging member. Therefore, the uniformity of the bearing surface can be excellently maintained irrespective of a change in temperature, and the reliability of the fluid bearing unit can be enhanced.

EXAMPLE III

However, the following problems may be encountered in the motor of Example II described before: The linear expansion coefficient of the bearing holder 35 is higher than that of the radial sliding bearing 37, and further an overall outer circumferential surface of the radial sliding bearing 37 is fixed onto an inner circumferential surface of the bearing holder 35. Therefore, the radial sliding bearing 37 is given a high thermal stress by the bearing holder 35 when the environmental temperature changes. Accordingly, a bearing clearance between the rotational shaft 40 and the radial sliding bearing 37 is extended at high temperature and reduced at low temperature compared with a case in which the radial sliding bearing 37 is not fixed to the bearing holder 35.

When the bearing clearance is extended at high temperature, dynamic pressure is lowered. On the other hand, when the bearing clearance is reduced at low temperature, bearing loss is increased, which causes problems in the fluid bearing unit.

With reference to the accompanying drawings, an example of the present invention in which the above problems are solved will be explained below.

FIGS. 9(a) through 9(f) are views showing bearings, bearing fixing sections and shafts of the dynamic pressure bearing units of Examples III-1 through III-6 of the present invention, wherein the views are taken in the direction of the axis.

Figure 9A:
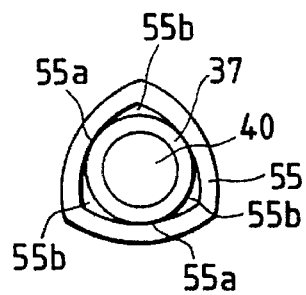
FIGS. 9(a) to (f) are views of the bearing, bearing fixing member and shaft of the dynamic pressure bearing unit of Examples III-1 through III-6 of the present invention.
Figure 9B:
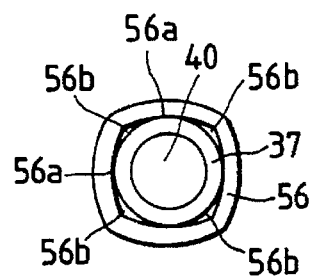
Figure 9C:
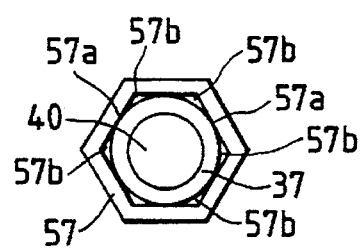
Figure 9D:
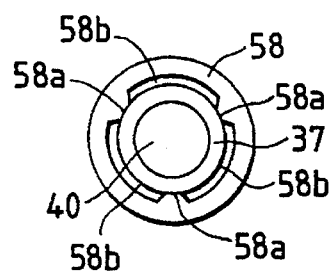

In Examples III-1 and III-4 shown in FIGS. 9(a) and 9(d), three recesses 55b (58b) are provided on the inner circumferential surface (shaft fixing surface) of the bearing holder 55 (58) in the axial direction, and the radial sliding bearing 37 is fixed by three line contact portions 55a (58a) provided along the axis. In this case, the contact portions 58a may be surface contact portions.

Figure 9E:
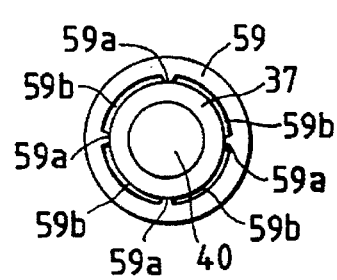

In Examples III-2 and III-5 shown in FIGS. 9(b) and 9(e), four recesses 56b (59b) are provided on the inner circumferential surface of the bearing holder 56 (59) in the axial direction, and the radial sliding bearing 37 is fixed by four line contact portions 56a (59a) provided along the axis. In this case, the contact portions 59a may be surface contact portions.

Figure 9F:
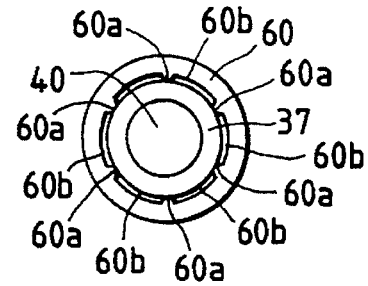

In Examples III-3 and III-6 shown in FIGS. 9(c) and 9(f), six recesses 57b (60b) are provided on the inner circumferential surface of the bearing holder 57 (60) in the axial direction, and the radial sliding bearing 37 is fixed by six line contact portions 57a (60a) provided along the axis. In this case, the contact portions 60a may be surface contact portions.

As explained above, in Examples III-1 through III-6, the recesses 55b through 60b are provided on the bearing fixing surfaces of the bearing holders 55 through 60. Accordingly, when the environmental temperature changes, the bearing holders 55a through 60a are deformed so that the thermal stress can be absorbed. Therefore, the thermal stress given to the radial sliding bearing 37 by the bearing holders 55a through 60a can be reduced.

Accordingly, it is possible to reduce the dynamic pressure and bearing loss caused in accordance with a change in the environmental temperature compared with a case (Example II) in which the overall outer circumferential surface of the radial sliding bearing 37 is fixed to the bearing holder.

FIG. 10 is a lateral sectional view showing only primary portions of the bearing and bearing fixing member of the dynamic pressure bearing unit of Example III-7 of the present invention.

Figure 10A:
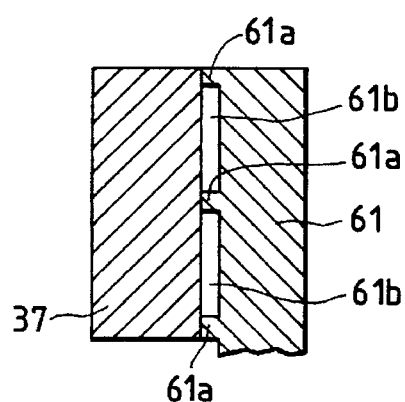
FIGS. 10(a) and (b) are lateral sectional view showing only the primary portions of the bearing and bearing fixing member of the dynamic bearing unit of Examples III-7 and III-8 of the present invention.

In Example III-7 shown in FIG. 10(a), two annular recesses 61b are provided in the axial direction on the inner circumferential surface (bearing fixing surface) of the bearing holder 61 in the circumferential direction. Therefore, the radial sliding bearing 37 is fixed by three surface contact portions 61a provided in the circumferential direction.

Figure 10B:
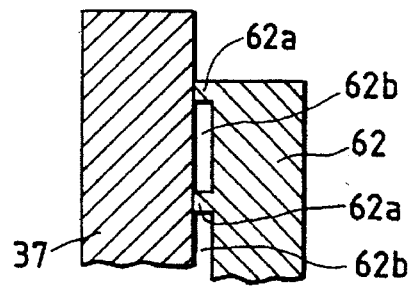

In Example III-8 shown in FIG. 10(b), two annular recesses 63b are provided in the axial direction on the inner circumferential surface of the bearing holder 63 in the circumferential direction. Therefore, the radial sliding bearing 37 is fixed by two surface contact portions 63a provided in the circumferential direction. In this case, the recess 63b provided on the lower side in the drawing is open downward in the drawing.

Of course, the same effect as that of Examples III-1 through III-6 can be provided when the recesses are formed in the circumferential direction instead of the axial direction as described above.

Figure 11:
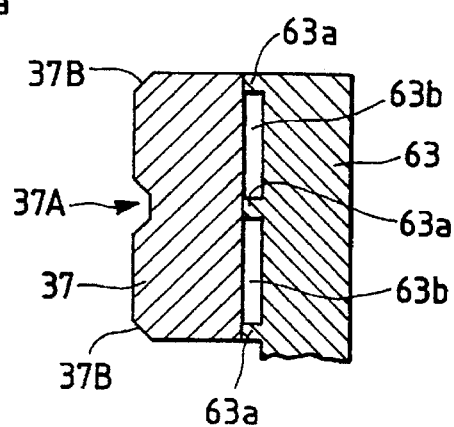
FIG. 11 is a lateral sectional view showing only the primary portions of the bearing and bearing fixing member of the dynamic bearing unit of Example III-9 of the present invention.

FIG. 11 is a lateral sectional view showing only primary portions of the bearing and bearing fixing member of the dynamic pressure bearing unit of Example III-9 of the present invention. FIG. 11 shows an improved example of the structure of the bearing unit of Example III-7 shown in FIG. 10(a).

In Example III-9, two recesses 63b are provided, so that three bearing fixing surfaces 63a are formed. An annular cutout portion 37A and chamfered portions 37B, 37B are formed on the inner circumferential surface of the radial sliding bearing 37 corresponding to the three bearing fixing surfaces 63a in the radial direction.

When the inner circumferential surface of the radial sliding bearing 37 is affected by the thermal stress caused in the bearing holder 63, it can be considered that portions on the inner circumferential surface of the radial sliding bearing 37 corresponding to the bearing fixing surfaces 63a are affected by the thermal stress. In Example III-9, the cutout portion 37A and chamfered portions 37B, 37B are formed in portions corresponding to the bearing fixing surfaces 63a in the radial direction, so that these portions affected by the thermal stress are not used as a bearing surface. Accordingly, even when the inner circumferential surface of the radial sliding bearing 37 is affected by the thermal stress of the bearing holder 53, a bad influence is not exerted on the bearing clearance between the rotational shaft 40 and the radial sliding bearing 37. Therefore, the effect of Example III-7 described before can be further enhanced.

Of course, the structures shown in Examples III-1 through III-6 may be combined with the structures shown in Examples III-7 through III-9.

As described above, recess portions are formed on the bearing fixing surface of the bearing holder, so that the thermal stress transmitted from the bearing holder to the radial sliding bearing can be reduced. Therefore, the bearing clearance adjusted to be small is not extended at high temperature. Also, the bearing clearance adjusted to be large is not reduced at low temperature. In other words, the dynamic pressure is seldom lowered at high temperature, and an increase in the bearing loss is suppressed at low temperature. Therefore, it is possible to reduce fluctuations of the dynamic pressure and bearing loss caused when the environmental temperature changes.

EXAMPLE IV

The inventors solved the problems of the motor described in Example II by another method. Therefore, Example IV of the present invention will be explained with reference to the accompanying drawings.

Figure 12A:
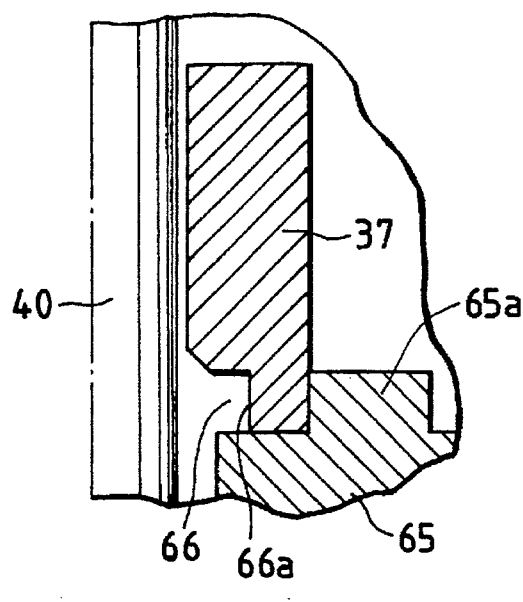
FIGS. 12(a) and (b) are lateral sectional views showing only the primary portions of the bearing, bearing fixing member and shaft of the dynamic bearing unit of Examples IV-1 and IV-2 of the present invention.
Figure 12B:
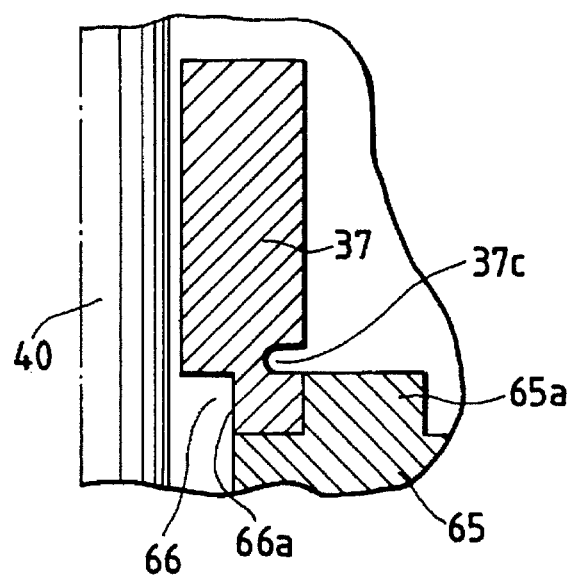

FIGS. 12(a) and 12(b) are laterally sectional views showing only the primary portions of the bearing, bearing fixing member and shaft of the fluid bearing unit of an example of the present invention.

In Example IV-1 shown in FIG. 12(a), a lower end of the radial sliding bearing 37 is fixed in the radial direction by an annular protruding member protruding upward from the bearing holder 65 which is a member for fixing the bearing. An annular cutout 66 is provided in a portion on the inner circumferential surface of the bearing 37 radially corresponding to the protruding portion 65a of the radial sliding bearing 37. Due to the cutout 66, the inner circumferential surface 66a recessed in the radial direction does not function as a bearing surface. In this case, when the environmental temperature changes, a thermal stress is activated on the radial sliding bearing 37 by the protruding portion 65a of the bearing holder 65. The portion where the thermal stress is activated is located on the inner circumferential surface 66a of the bearing radially corresponding to the protruding portion 65a. However, this portion is not used as a bearing surface, so that no problems are caused even if the aforementioned portion is deformed.

Due to the foregoing, a bad influence can be reduced in which the bearing clearance between the rotational shaft 40 and the bearing surface is increased at high temperature and decreased at low temperature by the thermal stress caused by the protruding portion 65a.

Therefore, in this Example IV, it is possible to reduce fluctuations of the dynamic pressure and bearing loss caused by a change in the environmental temperature compared with Example II in which the inner circumferential surface of the bearing corresponding to the bearing fixing section affected by the thermal stress is used as a bearing surface.

Example IV-2 shown in FIG. 12(b) is composed substantially in the same manner as Example IV-1 shown in FIG. 12(a). In Example IV-1, a cutout 37C is formed in a portion of the radial sliding bearing 37, wherein the portion comes into contact with the upper end surface of the protruding section 65a. In this way, it is possible to reduce the thermal stress impressed upon the bearing surface of the radial sliding bearing 37. Due to the structure described above, the effect of Example IV-1 shown in FIG. 12(a) can be further enhanced.

Figure 13A:
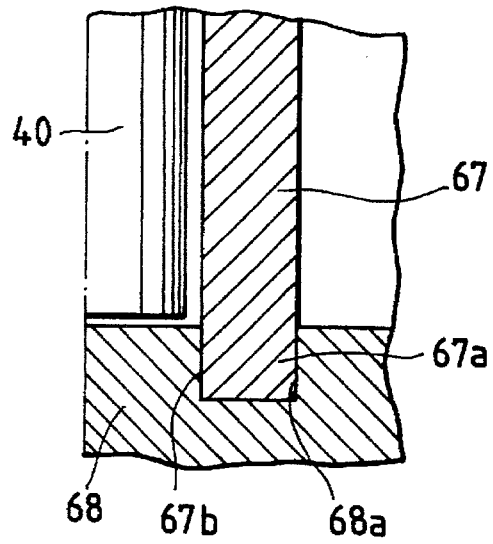
FIGS. 13(a) and (b) are lateral sectional views showing only the primary portions of the bearing, bearing fixing member and shaft of the dynamic bearing unit of Example IV-3 of the present invention.
Figure 13B:
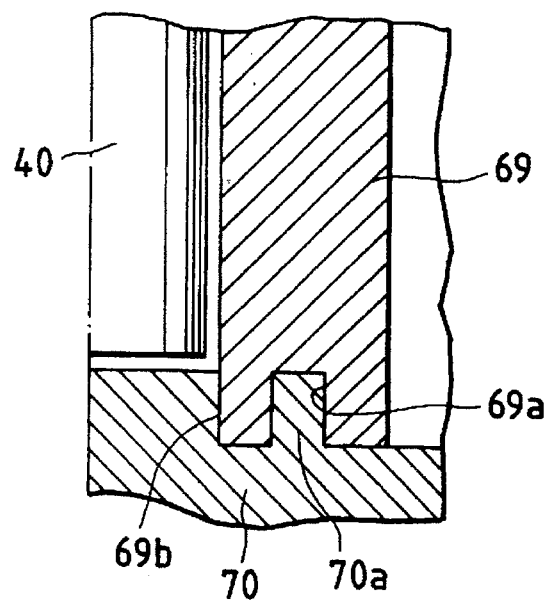

FIGS. 13(a) and 13(b) are laterally sectional views showing only the primary portions of the bearing, bearing fixing member and shaft of the fluid bearing unit of another example of the present invention.

Example IV-3 shown in FIG. 13(a) is constructed in the following manner:

A plate-shaped bearing holder 68 which also functions as a thrust bearing is provided immediately below the rotational shaft 40. An annular groove 68a is provided in the periphery of a portion opposed to the rotational shaft 40 of the bearing holder 68. A lower end portion 67a of the radial sliding bearing 67 is inserted into the groove 68a so that the radial sliding bearing 67 can be fixed in the radial direction.

Accordingly, in the radial sliding bearing 67, the inner circumferential surface 67a of the bearing radially corresponding to the annular groove 68a does not function as a bearing surface.

Example IV-3 shown in FIG. 13(b) is constructed in the following manner:

A plate-shaped bearing holder 70 which also functions as a thrust bearing is provided immediately below the rotational shaft 40. Annular cutout and protruding portions are provided in the periphery of a portion opposed to the rotational shaft 40 of the bearing holder 70. An annular groove 69a provided at the lower end of the radial sliding bearing 69 is inserted into a protruding portion 70a of the cutout and protruding portions so that the radial sliding bearing 69 can be fixed in the radial direction. In this case, an upper end surface of the protruding portion 70a is constructed in such a manner that it does not protrude from an upper surface of the bearing holder 70.

Even in the structure described above, a portion on the inner circumferential 69b radially corresponding to the protruding portion 70a does not function as a bearing surface in the radial sliding bearing 69.

Therefore, even when the bearing unit is composed in the manner shown in FIGS. 13(a) and 13(b), it is possible to reduce the fluctuations of dynamic pressure and bearing loss caused by a change in the environmental temperature compared with Example II in which the inner circumferential surface of the bearing corresponding to the bearing fixing section affected by the thermal stress is used as a bearing surface.

As described above, according to the fluid bearing unit of the present invention, when a thermal stress is activated on the bearing by the bearing fixing member in the case of a change in the environmental temperature, the portion on the inner circumferential surface of the bearing affected by the thermal stress is not used as a bearing surface. Therefore, the bearing gap between the shaft and the bearing surface is not extended by the thermal stress transmitted from the bearing fixing member at high temperature, and it is not reduced at low temperature.

Consequently, the fluctuations of dynamic pressure and bearing loss caused in accordance with a change in the environmental temperature can be reduced as compared with Example II in which the bearing surface is made to radially corresponds with the bearing fixing section subjected to the thermal stress.

EXAMPLE V

Next, a method of manufacturing the radial sliding bearing made of SUPER-INVAR (32%Ni-5%Co-Fe) described in Examples I through IV will be explained as follows.

The radial sliding bearing is manufactured by the method of powder metallurgy (the sintering method). That is, after powder of SUPER-INVAR has been pressurized and tightened, it is baked and solidified at a high temperature of about 1000° C. so that the surface of powder can be melted.

According to the above method, the radial sliding bearing can be simply molded, and the dimensional accuracy can be highly enhanced.

However, when the radial sliding bearing of a sintered body is manufactured by the above method, the following problem may be encountered: Dynamic pressure leaks through the blow-holes of a sintered body, so that the dynamic pressure characteristics can not be competently maintained. Further, an amount of added fluid fluctuates.

In order to solve the above problem, anaerobic resin or anaerobic UV resin (for example, acrylic resin) was impregnated into the blow-holes of the sintered body so as to eliminate the blow-holes. In some cases, materials having lubricating and anti-abrasion abilities may be added to the impregnating resin, and this resin is impregnated into the blow-holes of a sintered body.

Due to the foregoing, a sliding ability is given to the impregnating resin, so that the anti-abrasion ability can be enhanced.

Usable examples of the material having the lubricating and anti-abrasion abilities are: PTFE, $MoS_2$, SiC, and BN.

According to the method of manufacturing the fluid bearing unit of this example, at least one of the bearing and the bearing fixing member is molded by the method of powder metallurgy (the sintering method). Therefore, the members can be simply molded, and the dimensional accuracy can be highly enhanced.

Further, resin to which materials having lubricating and anti-abrasion abilities are added is impregnated into the sintered body, the sliding and anti-abrasion abilities can be enhanced.

EXAMPLE VI

Other than the powder metallurgy method described above, it is possible to mold the radial sliding bearing by the metal injection molding method.

According to this method, the radial sliding bearing is molded in the following manner: Powder of SUPER-INVAR is kneaded with binder composed of polyethylene resin. Then it is injected into a metallic mold having a predetermined configuration so that an intermediate body is made. This intermediate body is heated to a temperature in a range from 200° to 300° C. so that the binder is vaporized. Then, the intermediate body is baked and solidified at a high temperature not less than 1000° C.

With reference to the examples, the present invention is specifically described above. However, it should be noted that the present invention is not limited to the above specific Examples I through V, and variations may be made by one skilled in the art without departing from the spirit and scope of the present invention.

For example, in the present invention, the radial sliding bearing is made of SUPER-INVAR (32%Ni-5%Co-Fe), however, when it is made of INVAR (36%Ni-Fe), the same effect can be provided.

Materials to be used for making the radial sliding bearing are not limited to INVAR and SUPER-INVAR. Iron alloys may be used in which the volumetric magnetostriction functions to cancel the thermal expansion and as a result the linear expansion coefficient of the radial sliding bearing becomes lower than that of the shaft.

Further, the radial sliding bearing may be made of conventional materials, and the hub for fixing the radial sliding bearing may be made of iron alloy such as INVAR or SUPER-INVAR, in which the volumetric magnetostriction functions to cancel the thermal expansion and as a result the linear expansion coefficient of the radial sliding bearing becomes lower than that of the shaft. The above construction can provide the same effect.

Of course, the same effect can be provided when both the radial sliding bearing and the hub are made of iron alloy.

In Examples I through V explained above, a herring-bone-shaped dynamic pressure generating groove is formed on the shaft as a dynamic pressure generating means. However, the dynamic pressure generating groove may be formed on the inner circumferential surface of the bearing. Further, for example, a spiral groove may be used for the dynamic pressure generating groove.

In the same manner, the dynamic pressure generating means is not limited to the grooves. For example, a protrusion for supporting the rotational body is provided in one of the rotational body and the non-rotational body, and a wedge-shaped clearance is formed between the protrusion and the shaft so that the dynamic pressure effect can be provide.

Both the center shaft fixing type motor and the center shaft rotating type motor may be applied to Examples I through VI described before.

In Examples I through VI, examples of the fluid bearing unit applied to the spindle motor for driving magnetic disks are explained. It should be noted that the fluid bearing unit can be applied to other motors in the same manner.

What is claimed is:

1. A fluid bearing unit comprising:

a shaft;

a bearing which circumscribes said shaft with a space therebetween in which a bearing fluid is provided so that said shaft and bearing can be relatively rotated so as to generate dynamic pressure in the bearing fluid; and a bearing fixing member at least partially circumscribing said bearing for fixing the bearing relative to said shaft;

a magnetic seal for sealing said bearing fluid within said space so as to magnetize said bearing fluid, wherein at least one of the bearing and the bearing fixing member is made of an iron alloy having a volumetric magnetostriction which acts to cancel thermal expansion thereof; and a stress dispersion means for maintaining the bearing surface in a uniform temperature changing condition, the stress dispersion means being provided in at least one of the bearing and the bearing fixing member.

2. The fluid bearing unit according to claim 1, wherein the iron alloy is INVAR.

3. The fluid bearing unit according to claim 1, wherein the iron alloy is SUPER-INVAR.

4. The fluid bearing unit according to claim 1, wherein the stress dispersion means includes a cutout.

5. The fluid bearing unit according to claim 1, wherein the stress dispersion means contains end surfaces of the bearing and the bearing fixing member which substantially coincide with each other in the axial direction.

6. A fluid bearing unit described claim 1, wherein at least one of the bearing and the bearing fixing member is molded by a powder metallurgy method.

7. A fluid bearing unit according to claim 6, wherein resin is impregnated into blow-holes of a molded sintered body.

8. A fluid bearing unit according to claim 7, wherein the impregnating resin is an anaerobic resin or an anaerobic UV type resin.

9. A fluid bearing unit according to claim 7, wherein materials having lubricating and anti-abrasion abilities are added to the impregnating resin.

10. A fluid bearing unit according to claim 9, wherein the materials having lubricating and anti-abrasion abilities are PTFE, $MoS_2$, SiC and BN.

11. A fluid bearing unit described in claim 1, wherein at least one of the bearing and the member for fixing the bearing is molded by the metal powder injection molding method.

12. A fluid bearing unit comprising:

a shaft;

a bearing which circumscribes said shaft with a space therebetween in which a bearing fluid is provided so that said shaft and bearing can be relatively rotated so as to generate dynamic pressure in the bearing fluid; and a bearing fixing member at least partially circumscribing said bearing for fixing the bearing relative to said shaft wherein at least one of the bearing and the bearing fixing member is made of an iron alloy having a volumetric magnetostriction which acts to cancel thermal expansion thereof and wherein an inner circumferential surface of said bearing fixing member is recessed such that said bearing fixing member includes a plurality of bearing surfaces contacting said bearing.

13. A fluid bearing unit according to claim 12, wherein portions on the inner circumferential surface of said bearing which are radially opposed by said bearing surfaces are recessed.

* * * * *